United States Patent
Laigo

(10) Patent No.: US 11,472,281 B2
(45) Date of Patent: Oct. 18, 2022

(54) HYBRID MODULE AND DRIVE ARRANGEMENT FOR A MOTOR VEHICLE

(71) Applicant: Schaeffler Technologies AG & Co. KG, Herzogenaurach (DE)

(72) Inventor: Jonathan Laigo, Starsbourg (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/295,200

(22) PCT Filed: Oct. 28, 2019

(86) PCT No.: PCT/DE2019/100926
§ 371 (c)(1),
(2) Date: May 19, 2021

(87) PCT Pub. No.: WO2020/103974
PCT Pub. Date: May 28, 2020

(65) Prior Publication Data
US 2022/0009335 A1 Jan. 13, 2022

(30) Foreign Application Priority Data

Nov. 22, 2018 (DE) .......................... 102018129387.9

(51) Int. Cl.
*B60K 6/387* (2007.10)
*B60K 6/405* (2007.10)
(Continued)

(52) U.S. Cl.
CPC .............. *B60K 6/387* (2013.01); *B60K 6/405* (2013.01); *B60K 6/48* (2013.01); *F16D 25/082* (2013.01);
(Continued)

(58) Field of Classification Search
CPC .. B60K 2006/4825; B60K 6/48; B60K 6/405; B60K 6/387; F16D 25/082; F16D 25/10
See application file for complete search history.

(56) References Cited

U.S. PATENT DOCUMENTS 8,757,305 B2 * 6/2014 Roske ...................... B60K 6/48
180/65.22
9,193,255 B2 * 11/2015 Arnold .................... F16D 21/06
(Continued)

FOREIGN PATENT DOCUMENTS

DE   102012022290 A1   5/2014
DE   102014212799 A1   1/2015
(Continued)

*Primary Examiner* — Stacey A Fluhart

(57) ABSTRACT

A hybrid module includes a hybrid module housing which forms a housing interior divided by a partition. The housing interior includes at least one chamber designed as a dry space which is separated from a wet region by the partition, wherein the hybrid module has an electric machine and a first clutch device, in particular a separating clutch, in the dry space and has a second clutch device, in particular a dual clutch apparatus, in the wet region. An output side of the first clutch device is mechanically coupled to the input side of the second clutch device by an intermediate shaft, wherein the intermediate shaft is supported at least radially on the partition via at least one bearing unit.

13 Claims, 4 Drawing Sheets

(51) Int. Cl.
*B60K 6/48* (2007.10)
*F16D 25/08* (2006.01)
*F16D 25/10* (2006.01)
*F16D 25/12* (2006.01)

(52) U.S. Cl.
CPC ............ *F16D 25/10* (2013.01); *F16D 25/12* (2013.01); *B60K 2006/4825* (2013.01); *F16D 2300/08* (2013.01); *F16D 2300/22* (2013.01); *F16D 2300/26* (2013.01)

(56) References Cited

U.S. PATENT DOCUMENTS

| | | | |
|---|---|---|---|
| 9,580,059 B2* | 2/2017 | Ohnemus | B60W 10/02 |
| 10,850,604 B2* | 12/2020 | Pieper | F16D 13/52 |
| 2006/0289209 A1* | 12/2006 | Grosspietsch | B60L 50/16 |
| | | | 180/65.25 |
| 2019/0226550 A1* | 7/2019 | Weber | F16H 57/02 |
| 2019/0359049 A1* | 11/2019 | Wirachowski | F16H 45/02 |
| 2021/0276408 A1* | 9/2021 | Matschas | B60K 6/48 |
| 2021/0379982 A1* | 12/2021 | Omote | F16D 25/0638 |

FOREIGN PATENT DOCUMENTS

| | | | | |
|---|---|---|---|---|
| DE | 102017113713 B3 | 9/2018 | | |
| EP | 1970239 A1 * | 9/2008 | ............ | B60K 6/26 |
| EP | 1970239 A1 | 9/2008 | | |
| EP | 3026296 A1 | 6/2016 | | |
| WO | 2018/064998 A1 | 4/2018 | | |

\* cited by examiner

HYBRID MODULE AND DRIVE ARRANGEMENT FOR A MOTOR VEHICLE

CROSS-REFERENCE TO RELATED APPLICATIONS

This application is the U.S. National Phase of PCT Appln. No. PCT/DE2019/100926 filed Oct. 28, 2019, which claims priority to DE 102018129387.9 filed Nov. 22, 2018, the entire disclosures of which are incorporated by reference herein.

TECHNICAL FIELD

The disclosure relates to a hybrid module for a motor vehicle for coupling an internal combustion engine and a transmission, and to a drive arrangement for a motor vehicle having a hybrid module according to the disclosure and a drive unit, and a transmission.

BACKGROUND

A hybrid module generally comprises a connecting device for mechanically coupling an internal combustion engine, a separating clutch, with which a torque can be transmitted from the internal combustion engine to the hybrid module and with which the hybrid module can be separated from the internal combustion engine, an electric machine for generating a drive torque with a rotor and a dual clutch apparatus, with which a torque can be transmitted from the electric machine and/or from the separating clutch to a drive train. The dual clutch apparatus comprises a first partial clutch and a second partial clutch. An actuation system is assigned to each arranged clutch.

Currently available hybrid modules, which can combine an electric motor operation with an internal combustion engine operation by coupling an internal combustion engine to a drive train of a vehicle, usually have an electric machine, which is preferably an electric motor, as well as a separating clutch, its actuation system, bearing and housing components, which combine the three main components into a functional unit.

The electric machine enables the electric driving, the increase of power for the operation of the internal combustion engine and recuperation. The separating clutch and its actuation system ensure the coupling or uncoupling of the internal combustion engine.

A hybrid module is known from DE 10 2014 212799 A1, which comprises an electrical central release, a separating clutch and a dual clutch apparatus. In such hybrid modules, a separating clutch device can be arranged in a dry housing space, wherein the dual clutch apparatus is arranged in a wet housing space. A separating device for separating the two housing spaces can in particular be a piece of sheet metal with a corresponding sealing unit. Such hybrid modules can also be implemented by a separate construction of the housing spaces, which can advantageously be used for a separate delivery or assembly of the separating clutch device and the dual clutch apparatus on a vehicle.

From WO 2018/064 998 A1, a hybrid module for a motor vehicle is known which comprises an electric machine with a rotor and a stator as well as a dual clutch apparatus and a separating clutch. It is provided here to arrange the dual clutch apparatus and the separating clutch as a common clutch device radially within the space surrounding the rotor of the electric machine, wherein the electric machine with the common clutch device is spatially separated from a vibration damper by a wall of the housing of the hybrid module. The housing space in which the electric machine and the clutch device are arranged is designed to be wet, wherein the housing space in which the vibration damper is arranged is designed to be dry. The separating clutch and the dual clutch apparatus are thus arranged in a common wet housing space.

However, all spatial separations of the interiors of the housing result in additional material and volume requirements and make it more difficult for the individual devices of the hybrid module to be modular, which is helpful for assembly.

SUMMARY

On this basis, the object of the present disclosure is to provide a hybrid module and a drive arrangement equipped therewith, which combine a simple and cost-effective structure with efficiently used construction space.

The object is achieved by the hybrid module described in the disclosure and accompanying claims. Advantageous embodiments of the hybrid module and the drive arrangement are described herein.

The features of the claims may be combined in any technically useful way, including the explanations given in the following description and features of the figures can be used which comprise additional embodiments of the disclosure.

In connection with the present disclosure, the terms "axial" and "radial" always refer to the axis of rotation of the hybrid module, which corresponds here to the axis of rotation of the intermediate shaft.

The disclosure relates to a hybrid module for a motor vehicle for coupling an internal combustion engine and a transmission. The hybrid module comprises a hybrid module housing, which forms a housing interior that is divided by means of a partition so that at least one chamber is formed as a dry space in the housing interior, which is separated from a wet region by the partition. In the dry space, the hybrid module has an electric machine and a first clutch device, in particular a separating clutch, and in the wet region, the hybrid module has a second clutch device, in particular a dual clutch apparatus. An output side of the first clutch device is mechanically coupled to the input side of the second clutch device by means of an intermediate shaft, wherein the intermediate shaft is supported at least radially on the partition via at least one bearing unit.

It is thus provided that the intermediate shaft is mechanically coupled to the input side of the second clutch device.

The electric machine can be arranged both coaxially and axially parallel to the axis of rotation of the intermediate shaft.

The bearing unit can in particular be designed as a radial bearing and advantageously can also be set up to absorb axial forces.

The partition can be provided with a sealing device in order to seal off the wet region from the dry space.

The first clutch device, in particular designed as a separating clutch, can be designed to be closed in the normal state, wherein the second clutch device, designed in particular as a dual clutch apparatus, can be designed to be open in the normal state. The normally open state of the second clutch device can be ensured, for example, by means of a spring element such as a plate spring or a compression spring.

The axial forces occurring when the first clutch device is actuated or in the closed state act in opposition to the axial forces via the intermediate shaft when the second clutch device is actuated or in the closed state, whereby they at least partially cancel each other out and the bearing unit is relieved.

The hybrid module according to the disclosure has the particular advantage that the partition realizes a sealing separation of the two regions or spaces formed by the housing, and the intermediate shaft is also supported at the same time.

According to one aspect of the disclosure, the partition is part of the hybrid module housing.

According to an advantageous embodiment, the hybrid module has a rotor unit which is non-rotatably coupled in the dry space to a rotor of the electric machine and to an output side of the first clutch device and is coupled to the intermediate shaft so that the rotor unit is mounted together with the intermediate shaft via the bearing unit on the partition. Accordingly, the partition does not take on the function of sealing the dry space from the wet region, but also supports the rotor.

According to a further embodiment, the second clutch device is a dual clutch apparatus which comprises two partial clutches, wherein both partial clutches are arranged in the wet region.

The two partial clutches can be arranged either axially next to one another or also radially one above the other. The arrangement of the partial clutches can be dependent on the design of the housing components adjacent to the second clutch device, such as a wall of a transmission housing designed as a transmission bell, which is shaped in a special way due to its adaptation to spatial restrictions, so that the positions of the partial clutches are also subject to these restrictions.

Alternatively, the second clutch device is a dual clutch apparatus which comprises two partial clutches, wherein only one of the two partial clutches is arranged in the wet region.

It can thus be provided that one of the two partial clutches is arranged together with the first clutch device in the dry space.

According to a further embodiment, a sealing element is provided on the outside of the hybrid module housing for implementing a liquid-tight connection with a transmission housing.

The sealing element can produce a flat contact or sealing effect in the axial direction or produce a substantially linear sealing effect in the radial direction on the transmission housing.

It can be provided, for example, to provide a sealing washer or a sealing ring between the hybrid module housing and the housing of the transmission.

According to a further aspect of the disclosure, the second clutch device is assigned at least one actuating device designed as a piston-cylinder unit, wherein the cylinder of the actuating device is supported on the partition, in particular, at least on its radial sides, is at least partially enclosed by the material forming the partition.

In particular, it can be provided here that the actuating device is provided for actuating one of the two partial clutches of the second clutch device configured as a dual clutch apparatus.

Alternatively, a plurality of actuating devices can be distributed over a circumference, for example offset from one another at regular angular intervals, in order to actuate at least one of the partial clutches.

Correspondingly, the force vectors brought about by actuating devices of this type run eccentrically to an axis of rotation of the hybrid module.

Furthermore, a mechanical clutch actuator can alternatively also be implemented as an actuating device.

In a further embodiment it is provided that the hybrid module, non-rotatably connected to an input side of the second clutch device, comprises a torsional vibration damper, in particular a centrifugal pendulum.

In particular, the rotor of the electric machine and the second clutch device can be connected to the torsional vibration damper. This connection can be designed, for example, by an outer disk carrier and a driving ring.

It can be provided that the torsional vibration damper is arranged in the axial direction adjacent to the electric machine or adjacent to the first clutch device.

It is advantageously provided in the hybrid module that an input side of the first clutch device is rotatably mounted on the intermediate shaft.

The hybrid module according to the disclosure has the advantage that a wall is used to separate the dry space from the wet region, which wall also realizes the purpose of supporting the intermediate shaft. This partition thus realizes a multiple function, whereby additional components and volume can be saved.

Furthermore, a drive arrangement for a motor vehicle is provided according to the disclosure, which has a hybrid module according to the disclosure and a drive unit and a transmission, wherein the hybrid module is mechanically connected or connectable to the drive unit and the transmission via at least one clutch device of the hybrid module.

According to an embodiment of the drive arrangement according to the disclosure, the hybrid module housing is mechanically connected to a housing of the transmission, wherein the connection between the hybrid module housing and the housing of the transmission is formed in a sealing manner. The housing of the transmission forms, at least in sections, together with the partition, a wet space of the drive arrangement, which includes the wet region of the hybrid module.

This means that, in one embodiment of the disclosure, the wet space, which is delimited on one side by the partition, is closed only by the housing of the transmission.

The sealing connection can be realized by the sealing element mentioned. In particular, the sealing connection realizes a seal against liquids.

The wet space can preferably be provided to be partially filled with an oil, in particular a transmission oil.

BRIEF DESCRIPTION OF THE DRAWINGS

The disclosure described above is explained in detail below based on the relevant technical background with reference to the associated drawings, which show advantageous embodiments. The disclosure is in no way restricted by the purely schematic drawings, although it should be noted that the embodiments shown in the drawings are not limited to the dimensions shown. In the drawings.

DETAILED DESCRIPTION

Figure 1:
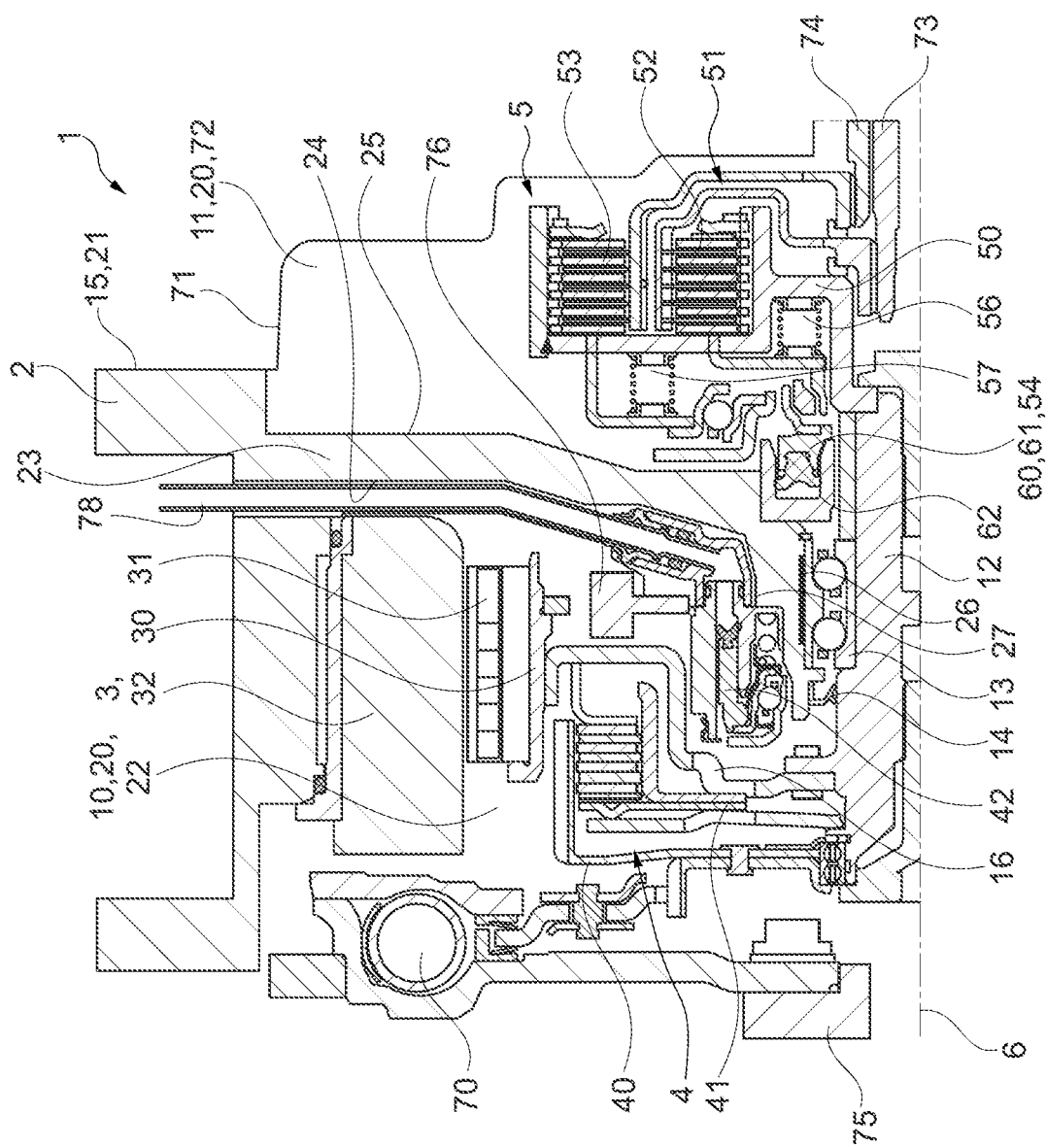
FIG. 1: shows a hybrid module according to the disclosure according to a first embodiment.

FIG. 1 shows a hybrid module 1 according to the disclosure according to a first embodiment.

The hybrid module 1 comprises a hybrid module housing 2, an electric machine 3, a first clutch device 4 and a second clutch device 5. The rotatable components of the hybrid module 1 rotate here about an axis of rotation 6 of the hybrid module, which at the same time corresponds to the axis of rotation of the intermediate shaft 12 shown.

The hybrid module housing 2 forms a housing interior 20 which is subdivided by means of a partition 23 of the hybrid module housing 2 that extends radially inward in the radial direction, namely into a chamber 22 as a dry space 10 on a first axial side 24 of the partition 23 and into a wet region 11 on a second axial side 25 of the partition 23, wherein the partition 23 spatially separates the dry space 10 and the wet region 11 from one another.

The electric machine 3 and the first clutch device 4 are arranged in the dry space 10, wherein the second clutch device 5 is arranged in the wet region 11. The first clutch device 4 is designed as a separating clutch, wherein the second clutch device 5 is designed as a dual clutch apparatus with a first partial clutch 52 and a second partial clutch 53.

The first clutch device 4 is positioned radially within a space formed by a rotor 31 of the electric machine 3 arranged on a rotor holder 30, wherein the stator 32 of the electric machine 3 is arranged in the radially outer section of the housing interior 20 on the hybrid module housing 2. Furthermore, a rotor position sensor 76 is arranged radially within the space formed by the rotor 31 axially between the first clutch device 4 and the partition 23 for scanning the angular position of the rotor 31.

A vibration damping unit 70, which is non-rotatably connected to a crankshaft 75 and which is arranged on the side of the electric machine 3 facing away from the intermediate wall 23 in the axial direction next to the electric machine 3 and the first clutch device 4, is non-rotatably connected to an input side 40 of the first clutch device 4 for transmitting torque from an internal combustion engine (not shown) connected to the crankshaft 75 to the first clutch device 4.

An actuating device 42 of the first clutch device 4 is arranged on a first axial side of the partition 24 of the partition 23, wherein the actuating device 42 of the first clutch device 4 is designed as a hydraulic actuating device and has a hydraulic line 78 for this purpose, which extends from outside the housing interior 20 through the hybrid module housing 2 and applied to the first axial side 24 of the partition 23 to the actuating device 42 of the first clutch device 4 and is fluidically connected to this.

A rotor unit 16 extends axially between the rotor position sensor 76 and the first clutch device 4 and, starting from the rotor 31, radially inwards, wherein it is non-rotatably connected to the rotor holder 30 and thus to the rotor 31 of the electric machine 3 and to an output side 41 of the first clutch device 4.

The hybrid module 1 further comprises an intermediate shaft 12, which is non-rotatably connected to the rotor unit 16, that is to say to the output side 41 of the first clutch device 4 and to the rotor 31 of the electric machine 3, and which is connected to an input side 50 of the second clutch device 5, that is to say is connected to the first partial clutch 52 and the second partial clutch 53.

The intermediate shaft 12 runs in the axial direction from the dry space 10 to the wet region 11, wherein the intermediate shaft 12 is supported via a bearing unit 13 on the radial inside 26 of the partition 23. The bearing unit 13 is designed as a roller bearing, in particular a double-row ball bearing, and is configured to support the intermediate shaft 12 on the partition 23 in both the axial and radial directions. A sealing device 14 is arranged between the radial inside 26 of the partition 23 and the intermediate shaft 12 for the fluidic separation of the dry space 10 from the wet region 11. The sealing device 14 is arranged axially next to the bearing unit 13 on the side of the bearing unit 13 facing the dry space 10, so that the bearing unit 13 itself is arranged in the wet region 11.

The two partial clutches 52, 53 of the second clutch device 5 configured as a double clutch are arranged next to one another in the radial direction, wherein the first partial clutch 52 is arranged radially inside the second partial clutch 53. An actuating device 54 of the first partial clutch 52 is designed as a concentric first piston-cylinder unit 60 with a first piston 61 and a first cylinder 62, wherein the first cylinder 62 is arranged on the second axial side 25 and the radial inside 26 of the partition 23. An actuating device (not shown here) of the second partial clutch 53 is designed as a further concentric piston-cylinder unit.

The two partial clutches 52, 53 each comprise a return spring 56, 57 for implementing a normally open position of the respective partial clutch 52, 53 in the load-free or actuation-free state. The two partial clutches 52, 53 are connected to a first transmission input shaft 73 and a second transmission input shaft 74 on an output side 51 of the second clutch device 5 facing away from the electric machine 3. A torque made available by an internal combustion engine (not shown) is thus introduced into the hybrid module 1 via the crankshaft 75 and transmitted via the vibration damper unit 70 to the first clutch device 4, from which the torque in turn is transmitted to the electric machine 3 or its rotor 31 and is transmitted from there via the rotor unit 16 to the intermediate shaft 12. The torque transmission path from the electric machine 3 to the transmission output shafts 73, 74 thus runs via the rotor unit 16 to the intermediate shaft 12 and from this with the first partial clutch 52 of the second clutch device 4 to the first transmission output shaft 73 or when the second partial clutch 53 of the second clutch device 4 to the second transmission output shaft 73.

If the first clutch device 4 is closed, the torque provided by the internal combustion engine (not shown) also runs substantially along the torque transmission path via the electric machine 3 or its rotor 31 to the transmission output shafts 73, 74.

FIG. 1 also shows a contour 71 of a housing of a transmission, which extends substantially on the side of the second clutch device 5 facing away from the electric machine 3 and is placed against the outside 21 of the hybrid module housing 2. The housing of the transmission thus forms, together with the second axial side 25 of the partition 23, a wet space 72 which encompasses the wet region 11. A sealing element 15 is provided between the housing of the transmission and the outside 21 of the hybrid module housing 2, which in the axial direction effects a flat contact or sealing effect between the contour 71 of the housing of the transmission and the outside 21 of the hybrid module housing 2 and thus fluidically seals the wet space 72.

The hybrid module and the transmission together form part of the drive arrangement according to the disclosure.

Figure 2:
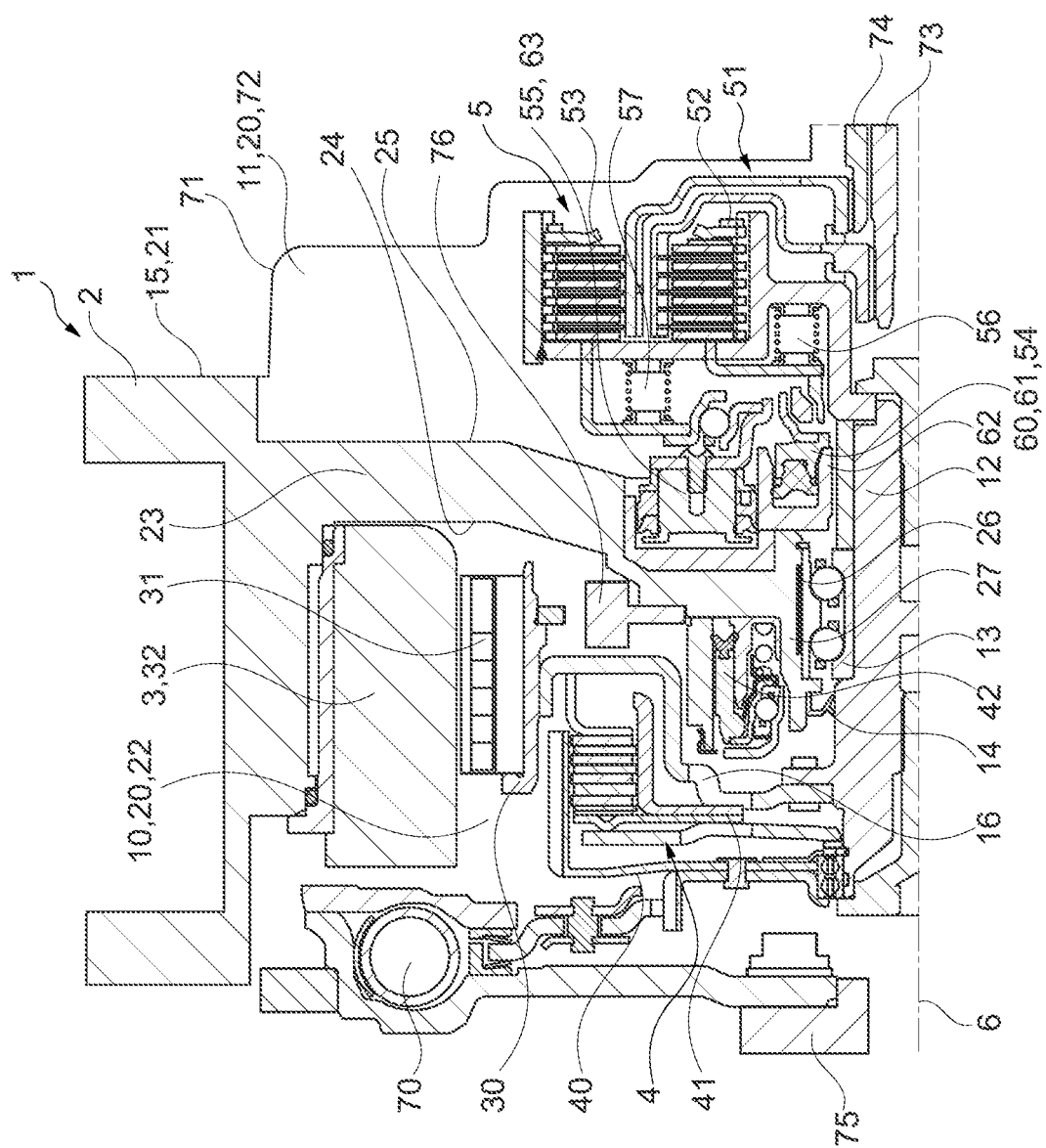
FIG. 2: shows a hybrid module according to the disclosure according to a second embodiment.

FIG. 2 shows an alternative embodiment in which, in contrast to the embodiment shown in FIG. 1, for the two partial couplings 52, 53 of the second clutch device 5, in addition to the concentric first piston-cylinder unit 60 shown in FIG. 1, a single, circumferentially arranged actuating device 55 of the second partial clutch 53 is shown, which is designed accordingly as an eccentric further piston-cylinder unit 63. It is advantageously provided that a plurality of such further piston-cylinder units 63 are arranged on the circumference shown here, at least three such units at an angular distance of 120°. Otherwise, the hybrid module shown in FIG. 2 substantially corresponds to the hybrid module shown in FIG. 1.

Figure 3:
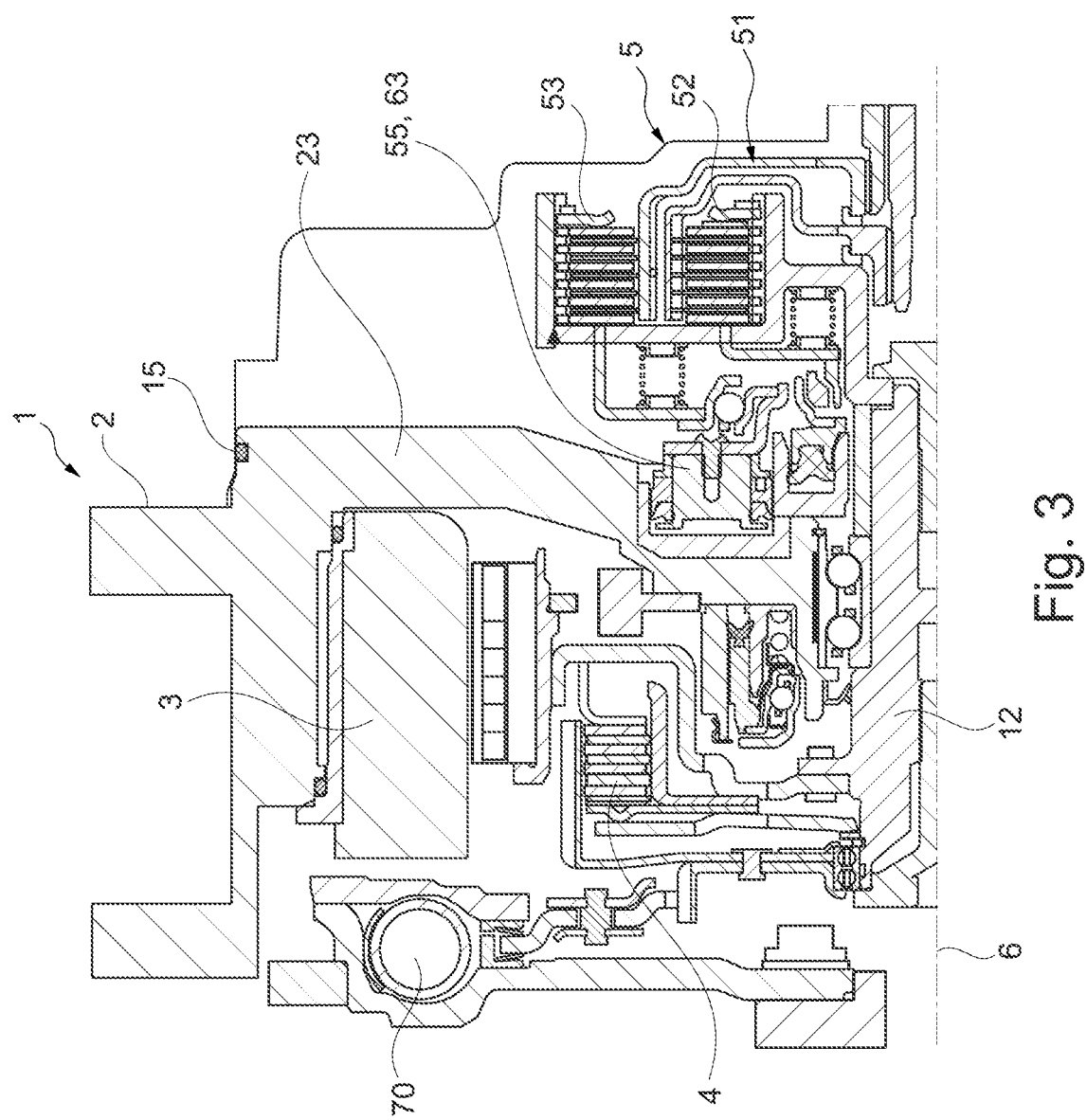
FIG. 3: shows a hybrid module according to the disclosure according to a third embodiment.

The embodiment of the hybrid module according to the disclosure shown in FIG. 3 is substantially realized according to the embodiment shown in FIG. 3, with the difference that, contrary to the versions shown in FIGS. 1 and 2, a sealing element 15 on the hybrid module housing 2 is arranged on a radial outside of the hybrid module housing 2 as a sealing ring, and not as shown in FIGS. 1 and 2 as a flat seal which is aligned to one axial side. Otherwise, reference is made to the description of FIGS. 1 and 2 with regard to the further elements of this embodiment of the hybrid module 1.

This seal 15, designed as a sealing ring, thus rests on a complementarily shaped radial inner wall of an adjoining housing of a transmission (not shown here) in order to separate the wet region 11 or the wet space formed thereby from the surroundings.

Figure 4:
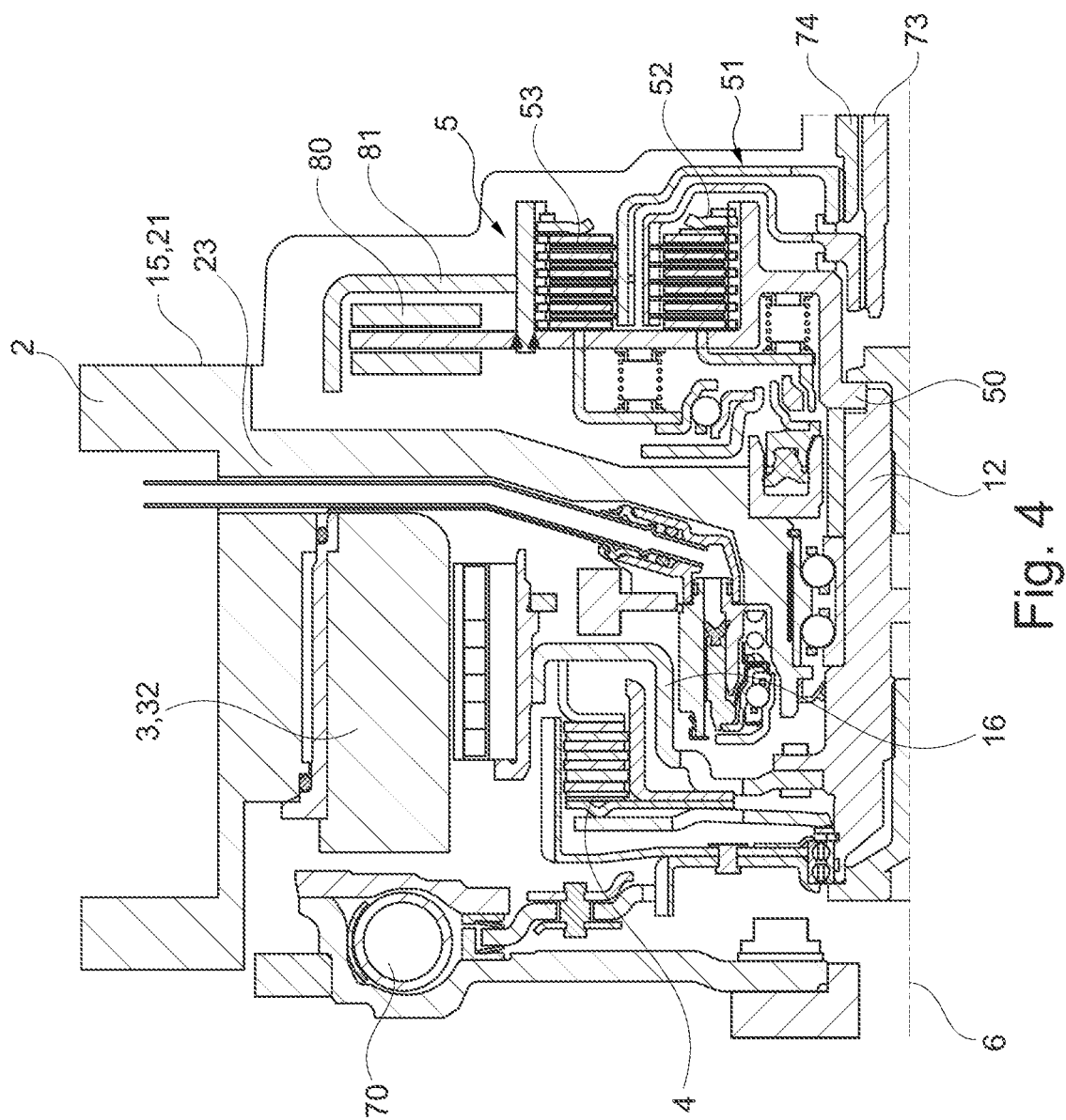
FIG. 4: shows a hybrid module according to the disclosure according to a fourth embodiment.

FIG. 4 shows an embodiment of the hybrid module 1 according to the disclosure which largely corresponds to the embodiment shown in FIG. 1, so that reference is made to the description of FIG. 1 with regard to the matching elements and features of the hybrid module 1.

The difference between the embodiment shown in FIG. 4 and the embodiment shown in FIG. 1 is the arrangement of a centrifugal pendulum 80 on the second clutch device 5, which is surrounded on one side axially and radially by a protective element 81. The centrifugal pendulum 80 is coupled to the second clutch device 5 in such a way that it is non-rotatably connected to the intermediate shaft 12 and thus also to the rotor unit 16 via the input side 50 of the second clutch device 5, so that all torsional vibrations acting on these elements can be at least partially eliminated or minimized by the centrifugal pendulum 80.

With the configuration according to the disclosure of the hybrid module proposed here, a simpler and more efficient design is combined with little need for construction space.

LIST OF REFERENCE NUMBERS

1 Hybrid module
2 Hybrid module housing
3 Electric machine
4 First clutch device
5 Second clutch device
6 Axis of rotation
10 Dry space
11 Wet region
12 Intermediate shaft
13 Bearing unit
14 Sealing device
15 Sealing element
16 Rotor unit
20 Housing interior
21 Outside of the hybrid module housing
22 Chamber
23 Partition
24 First axial side of the partition
25 Second axial side of the partition
26 Radial inside of the partition
27 Radial outside of the partition
30 Rotor holder
31 Rotor
32 Stator
40 Input side of the first clutch device
41 Output side of the first clutch device
42 Actuating device of the first clutch device
50 Input side of the second clutch device
51 Output side of the second clutch device
52 First partial clutch
53 Second partial clutch
54 Actuating device of the first partial clutch
55 Actuating device of the second partial clutch
56 Return spring of the first partial clutch
57 Return spring of the second partial clutch
60 First piston-cylinder unit
61 First piston
62 First cylinder
63 Further piston-cylinder unit
70 Vibration damper unit
71 Contour of the transmission housing
72 Wet space
73 First transmission input shaft
74 Second transmission input shaft
75 Crankshaft
76 Rotor position sensor
77 Torsional vibration damper
78 Hydraulic line
80 Centrifugal pendulum
81 Protective element

The invention claimed is:

1. A hybrid module for a motor vehicle for coupling an internal combustion engine and a transmission, comprising a hybrid module housing forming a housing interior divided by a partition, wherein the housing interior includes at least one chamber configured as a dry space separated from a wet region by the partition, and wherein an electric machine and a first clutch device, is disposed in the dry space and a second clutch device is disposed in the wet region, and an output side of the first clutch device is mechanically coupled to an input side of the second clutch device by an intermediate shaft, wherein the intermediate shaft is supported at least radially on the partition via at least one bearing unit, and wherein the second clutch device is assigned at least one actuating device designed as a piston-cylinder unit, wherein a cylinder of the actuating device is supported on the partition and is at least partially enclosed by material forming the partition.

2. The hybrid module according to claim 1, wherein the partition is integral with the hybrid module housing.

3. The hybrid module according to claim 1, further comprising: a rotor unit non-rotatably coupled in the dry space to a rotor of the electric machine and to the output side of the first clutch device and is coupled to the intermediate shaft so that the rotor unit is mounted together with the intermediate shaft on the partition via the bearing unit.

4. The hybrid module according to claim 1, wherein the second clutch device is a dual clutch apparatus that comprises two partial clutches, wherein both partial clutches are arranged in the wet region.

5. The hybrid module according to claim 1, wherein the second clutch device is a dual clutch apparatus that comprises two partial clutches, wherein only one of the two partial clutches is arranged in the wet region.

6. The hybrid module according to claim 1, wherein a sealing element is provided on an outside of the hybrid module housing and configured for implementing a liquid-tight connection with a transmission housing.

7. The hybrid module according to claim 1, further comprises a centrifugal pendulum non-rotatably connected to an input side of the second clutch device.

8. A drive arrangement for a motor vehicle, comprising a hybrid module according to claim 1 and a drive unit including an internal combustion engine and a transmission, wherein the hybrid module is mechanically connectable to the drive unit and the transmission via at least one of the first clutch device or the second clutch device of the hybrid module.

9. The drive arrangement according to claim 8, wherein the hybrid module housing is mechanically connected to a transmission housing of the transmission, wherein the connection between the hybrid module housing and the transmission housing is configured to be sealing and the transmission housing forms the wet region of the drive arrangement at least in sections together with the partition, which drive arrangement comprises the wet region of the hybrid module.

10. A hybrid module for a motor vehicle for coupling an internal combustion engine and a transmission, comprising:

- a hybrid module housing arranged to form a housing interior divided by a partition, wherein the housing interior includes at least one chamber configured as a dry space separated from a wet region by the partition;
- an electric machine disposed in the dry space;
- a first clutch device disposed in the dry space;
- a second clutch device disposed in the wet region, wherein an output side of the first clutch device is mechanically coupled to an input side of the second clutch device by an intermediate shaft, wherein an input side of the first clutch device is rotatably mounted on the intermediate shaft; and
- an actuating device supported on the partition and configured to actuate the first clutch.

11. The hybrid module according to claim 10, wherein the second clutch is a dual clutch including a first partial clutch and a second partial clutch.

12. The hybrid module according to claim 11, further comprising a centrifugal pendulum mounted on a respective one of the first partial clutch or the second partial clutch.

13. The hybrid module according to claim 12, further comprising a protective element fixed to and extending radially outward from the respective partial clutch, wherein the protective element is arranged to surround the centrifugal pendulum on one side axially and radially.

* * * * *